(12) United States Patent
Singh et al.

(10) Patent No.: US 6,798,603 B1
(45) Date of Patent: Sep. 28, 2004

(54) DISK DRIVE UNLATCHING AN ACTUATOR ARM AT A FIRST SPINDLE SPEED DURING A FIRST SPIN-UP MODE AND A SECOND SPINDLE SPEED DURING A SECOND SPIN-UP MODE

(75) Inventors: Dalwinder Singh, Laguna Hills, CA (US); Steven Nemshick, Santa Ana, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 286 days.

(21) Appl. No.: 10/209,705

(22) Filed: Jul. 31, 2002

(51) Int. Cl.[7] ............................................... G11B 15/46
(52) U.S. Cl. .................................................. 360/73.03
(58) Field of Search ................................ 360/73.03, 75

(56) References Cited

U.S. PATENT DOCUMENTS 5,729,399 A    3/1998  Albrecht et al.
6,271,980 B1 *  8/2001  Ginosar et al. ............... 360/75
6,714,377 B2 *  3/2004  Bement et al. ............... 360/75

* cited by examiner

*Primary Examiner*—David Hudspeth
*Assistant Examiner*—Mitchell Slavitt
(74) *Attorney, Agent, or Firm*—Won Tae C. Kim, Esq.; Milad G. Shara, Esq.; Howard H. Sheerin, Esq.

(57) ABSTRACT

A disk drive is disclosed comprising a disk, a spindle motor for rotating the disk, an actuator arm, and a head coupled to the actuator arm. While powered down the head is latched in a parked position. During a start-up process, the spindle motor is controlled to rotate the disk toward an operating speed and the head is unlatched prior to the disk reaching the operating speed. If the disk drive is in a first spin-up mode (e.g., a normal spin-up mode) the head is unlatched relative to a first target speed, and if the disk drive is in a second spin-up mode (e.g., a re-sync spin-up mode) the head is unlatched relative to a second target speed greater than the first target speed.

13 Claims, 4 Drawing Sheets

US 6,798,603 B1

DISK DRIVE UNLATCHING AN ACTUATOR ARM AT A FIRST SPINDLE SPEED DURING A FIRST SPIN-UP MODE AND A SECOND SPINDLE SPEED DURING A SECOND SPIN-UP MODE

CROSS REFERENCE TO RELATED APPLICATIONS AND PATENTS

This application is related to co-pending U.S. patent application Ser. No. 09/505,009 entitled "DISK DRIVE COMPRISING AN ACTUATOR DRIVER CIRCUIT FOR RETRACTING A HEAD INDEPENDENT OF A SERVO MICROPROCESSOR WHEN A SPINDLE SPEED FAULT MODE IS DETECTED" filed Feb. 15, 2000, the disclosure of which is incorporated herein by reference.

BACKGROUND OF THE INVENTION

1. Field of the Invention

The present invention relates to disk drives for computer systems. More particularly, the present invention relates to a disk drive unlatching an actuator arm at a first spindle speed during a first spin-up mode and a second spindle speed during a second spin-up mode.

2. Description of the Prior Art

When a disk drive is powered down, a head connected to a distal end of an actuator arm is latched into a parked position to protect the head as well as the data area of the disk. The actuator arm is rotated about a pivot by a voice coil motor into the parked position where the actuator arm is typically constrained by a magnetic latch. The head may be parked on the disk, for example on an inner diameter landing zone which is typically textured to reduce stiction. When the disk drive is powered on, a spindle motor spins up the disk to an operating spin rate or "operating speed" which allows the disk drive to "synchronize" to embedded servo sectors recorded on the disk.

During the spin-up process it is desirable to unlatch the actuator arm as soon as possible and move the head over the smooth data area of the disk in order to minimize head wear caused by the textured landing zone. In prior art disk drives the actuator arm may be unlatched early in the spin-up process once the disk reaches a target speed less than the operating speed. The target speed is typically selected as the minimum speed (within a predetermined tolerance) that enables the head to fly, with stability, over the smooth data area of the disk surface. Various factors influence the target speed, including the strength of the magnetic latch, the mechanical resonances of the actuator assembly, the aerodynamics of the actuator arm and head, etc.

During the spin-up process or during the normal operating mode the disk drive may encounter an error condition, such as a momentary power loss, wherein the disk drive will latch the actuator arm back into it's parked position. When the error condition subsides, the disk drive will attempt to "re-sync" by unlatching the actuator arm after the disk reaches the target speed. However, the impact of the actuator arm latching into the parked position may excite the mechanical resonances of the actuator assembly causing the head to vibrate. If the error condition subsides quickly, any residual resonance may affect the stability of the head when the actuator arm unlatches. In some cases the residual resonance will prevent the head from flying with stability at the target speed causing the head to strike the disk surface as the actuator arm unlatches during the re-sync spin-up mode. This is undesirable since it may damage the head as well as corrupt the data recorded on the disk.

There is, therefore, a need to reduce head wear in a disk drive by unlatching the actuator arm early in the spin up process while ensuring the head will fly with stability during a re-sync spin-up mode.

SUMMARY OF THE INVENTION

The present invention may be regarded as disk drive comprising a disk, a spindle motor for rotating the disk, an actuator arm, a head coupled to the actuator arm, and disk control circuitry. The disk control circuitry latches the head into a parked position when the disk drive is powered down. During a start-up process, the speed of the spindle motor is controlled to rotate the disk toward an operating speed. If the disk drive is in a first spin-up mode, the speed of the spindle motor is compared to a first target speed and the head is unlatched relative to the first target speed. If the disk drive is in a second spin-up mode, the speed of the spindle motor is compared to a second target speed and the head is unlatched relative to the second target speed. The first target speed and second target speed are less than the operating speed, and the second target speed is greater than the first target speed.

In one embodiment, the disk control circuitry comprises a microprocessor executing a control program.

In one embodiment, the first spin-up mode is a normal spin-up mode and the second spin-up mode is a re-sync spin-up mode. In one embodiment, the disk control circuitry evaluates the speed of the spindle motor at the beginning of the start-up process to determine whether the disk drive is in the normal spin-up mode or the re-sync spin-up mode.

In one embodiment, the disk control circuitry re-latches the actuator arm if a predetermined error condition is detected. The disk drive enters the re-sync spin-up mode if the error condition causes the speed of the spindle motor to fall below the second target speed. The disk drive enters the normal spin-up mode if the error condition causes the speed of the spindle motor to fall below a threshold speed less than the first target speed.

In one embodiment, the second target speed is at least five percent greater than the first target speed.

The present invention may also be regarded as a method of operating a disk drive, the disk drive comprising a disk, a spindle motor for rotating the disk, an actuator arm, and a head coupled to the actuator arm. The head is latched into a parked position when the disk drive is powered down. During a start-up process, the spindle motor rotates the disk toward an operating speed. If the disk drive is in a first spin-up mode, the speed of the spindle motor is compared to a first target speed and the head is unlatched relative to the first target speed. If the disk drive is in a second spin-up mode, the speed of the spindle motor is compared to a second target speed and the head is unlatched relative to the second target speed. The first target speed and second target speed are less than the operating speed, and the second target speed is greater than the first target speed.

DESCRIPTION OF THE PREFERRED EMBODIMENTS

Figures 1A, 1B:
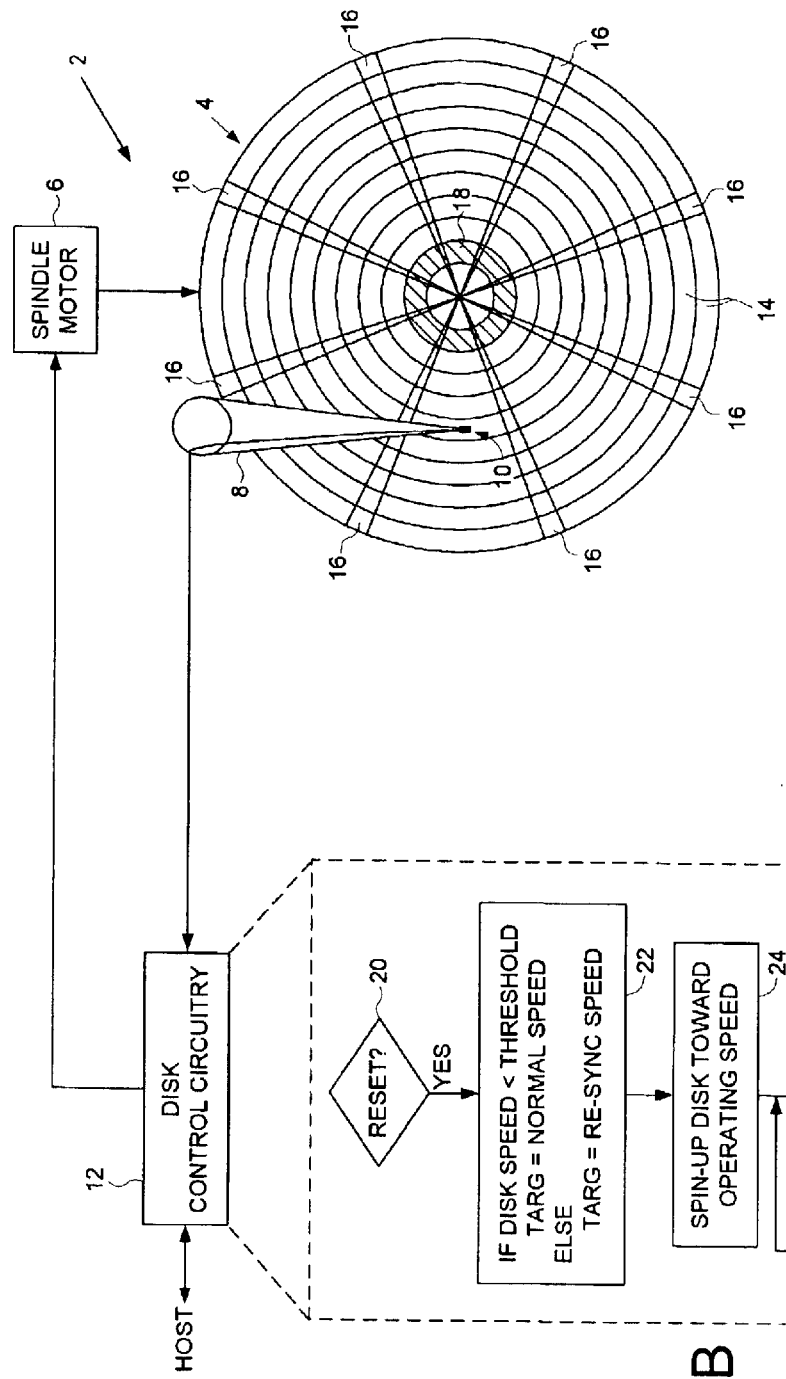
FIG. 1A shows a disk drive according to an embodiment of the present invention comprising a disk, a spindle motor for rotating the disk, an actuator arm, and a head coupled to the actuator arm.
FIG. 1B shows a flow chart executed by control circuitry of the disk drive for unlatching the head at a higher spindle speed during a re-sync spin-up mode.

FIG. 1A shows a disk drive 2 according to an embodiment of the present invention comprising a disk 4, a spindle motor 6 for rotating the disk 4, an actuator arm 8, a head 10 coupled to the actuator arm 8, and disk control circuitry 12. The disk control circuitry 12 latches the head 10 into a parked position when the disk drive 2 is powered down. During a start-up process, the speed of the spindle motor 6 is controlled to rotate the disk 4 toward an operating speed. If the disk drive 2 is in a first spin-up mode, the speed of the spindle motor 6 is compared to a first target speed and the head 10 is unlatched relative to the first target speed. If the disk drive 2 is in a second spin-up mode, the speed of the spindle motor 6 is compared to a second target speed and the head 10 is unlatched relative to the second target speed. The first target speed and second target speed are less than the operating speed, and the second target speed is greater than the first target speed.

In the embodiment of FIG. 1A, the disk 4 comprises a plurality of radially spaced, concentric tracks 14 which are partitioned into a number of data sectors. The disk 4 also comprises embedded servo sectors 16 recorded at a periodic interval along the circumference of each track. The embedded servo sectors 16 comprise head positioning information, such as a track number for coarse positioning and servo bursts for fine positioning. The disk 4 further comprises a landing zone 18 where the head 10 is parked while the disk 4 is not rotating (e.g., while the disk drive 2 is powered down). In one embodiment, the landing zone 18 is textured to reduce stiction between the head 10 and the landing zone 18 when the disk 4 is spun up to its operating speed. However, the textured surface of the landing zone 18 increases head wear as the disk 4 is spinning up toward the operating speed. Therefore it is desirable to unlatch the head 10 as early as possible during the spin-up process in order to minimize head wear.

As the disk 4 rotates toward its operating speed, an air bearing forms between the head 10 and the disk surface. When the disk 4 reaches a predetermined target speed, a sufficient air bearing will have formed to allow the head 10 to be unlatched safely. The target speed that the head 10 may be unlatched safely depends on the stability of the head 10 which may be affected by residual vibrations of the actuator assembly after being latched in to the parked position. After the head 10 is unlatched and begins flying over the data area of the disk 4, the disk control circuitry 12 waits for the disk 4 to reach its operating speed. At the operating speed the disk control circuitry 12 can "synchronize" to the embedded servo sectors 16 and begin servo controlling the position of the head 10 with respect to the tracks 14. If an error event occurs which reduces the speed of the spindle motor 6 (e.g., power loss) the disk control circuitry 12 must "re-sync" to the embedded servo sectors 16 after the disk 4 re-attains its operating speed.

FIG. 1B is a flow diagram according to an embodiment of the present invention executed by the disk control circuitry 12 of FIG. 1A. When the disk drive 2 is reset at step 20 (e.g., after a power on event or an error event) the speed of the spindle motor 6 is evaluated at step 22. If the disk drive 2 is reset after an error event (e.g., a momentary power loss), the spindle motor 6 may still be rotating and the head 10 may be vibrating due to the actuator arm 8 having been latched into the parked position. If at step 22 the speed of the spindle motor is greater than a threshold, then the disk drive 2 enters a re-sync spin-up mode by assigning a re-sync spin up target speed to a variable TARG. If at step 22 the speed of the spindle motor is less than the threshold, then the disk drive 2 enters a normal spin-up mode by assigning a normal spin-up target speed to the variable TARG. In one embodiment, the spindle motor 6 may still be rotating when the disk drive 2 is reset after an error event, but it is assumed the head 10 will have stopped vibrating if the speed of the spindle motor 6 falls below the threshold. In another embodiment, the threshold is set near zero so that the disk drive 2 enters the re-sync spin-up mode whenever the disk drive 2 is reset after an error event. In either case, the re-sync spin-up target speed is higher than the normal spin-up target speed to compensate for residual vibrations in the actuator assembly affecting the stability of the head 10. Waiting for the disk 4 to reach a higher speed before unlatching the head 10 ensures a more stable air bearing will form between the head 10 and the disk surface so that the head 10 can fly with stability even though it may be vibrating. Referring again to the flow diagram of FIG. 1B, at step 24 the disk control circuitry 12 controls the spindle motor 6 to begin rotating the disk 4 toward its operating speed. If at step 26 the speed of the spindle motor 6 is greater than the variable TARG, then at step 28 the disk control circuitry 12 unlatches the head 10.

The disk control circuitry 12 of FIG. 1A may comprise any suitable hardware and/or software for controlling the operations of the disk drive 2. In one embodiment, the disk control circuitry 12 comprises a microprocessor for executing a control program. The control program may perform suitable operations for interfacing with a host computer as well as performing appropriate coding, read/write channel, and servo control operations for interfacing with the disk 4. In another embodiment, the disk control circuitry 12 comprises dedicated circuitry for controlling the various operations of the disk drive, such as a disk controller for communicating with the host computer, a read/write channel for interfacing with the disk 4, a servo controller for controlling the position of the head 10 with respect to the disk 4, and a motor driver for driving the spindle motor 6 and a voice coil motor (VCM) for rotating the actuator arm 8 about a pivot. The dedicated circuitry may be implemented using multiple integrated circuits or combined into a single integrated circuit.

Figure 2:
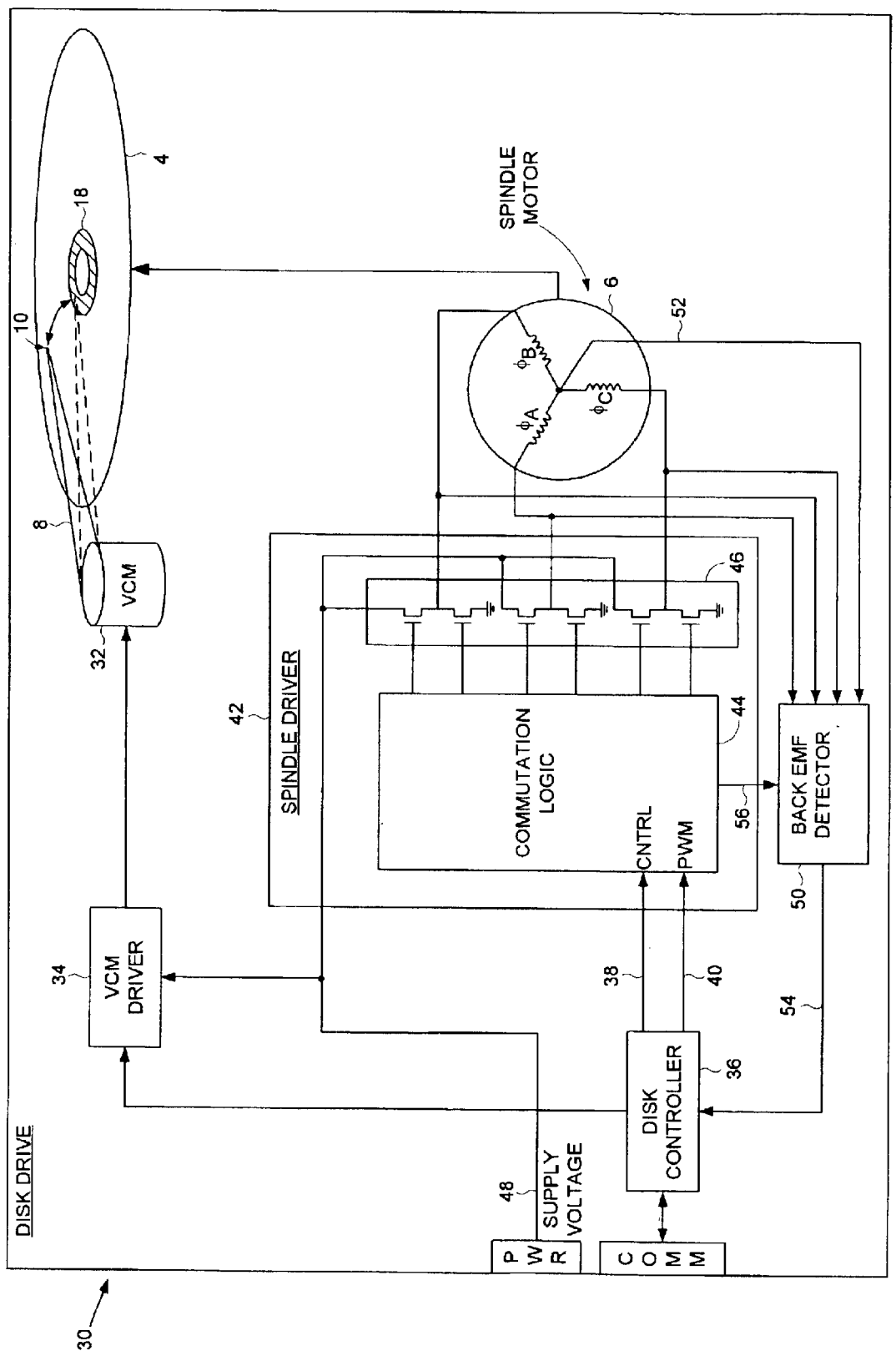
FIG. 2 shows further details of a disk drive according to an embodiment of the present invention wherein the speed of the spindle motor is determined from back EMF voltage crossings in the windings of the spindle motor.

FIG. 2 shows further details of a disk drive 30 according to an embodiment of the present invention. A VCM 32 is shown for rotating the actuator arm 8 and thereby positions the head 10 over the disk surface, including in and out of the landing zone 18. A VCM driver 34 generates the appropriate control signals applied to the VCM 32 in response to commands received from a disk controller 36. The disk controller 36 comprises suitable circuitry for interfacing with a host computer and generates control signals 38 as well as a pulse width modulated (PWM) signal 40 applied to a spindle driver 42. The spindle driver 42 comprises commutation logic 44 and switches 46 for applying a supply voltage 48 to the windings of the spindle motor 6 according to a commutation sequence which causes the spindle motor 6 to rotate. A back EMF detector 50 detects back EMF voltage crossings in the windings of the spindle motor 6 with respect to a center tap 52 and generates a square wave signal 54 indicative of a speed and commutation phase of the spindle motor 6. Because the back EMF voltage is distorted while the windings are connected to the power supply 48, the spindle driver 42 generates a control signal 56 applied to the back EMF detector 50 which identifies the "open" winding not being driven and therefore generating a valid back EMF voltage signal. The disk controller 36 evaluates the square wave signal 54 to determine the speed of the spindle motor 6, including to determine whether the spindle motor 6 is rotating after the disk drive 30 is reset at step 22 in FIG. 1B. During normal operation the disk controller 36 adjusts the PWM signal 40 in response to the square wave signal 54 in order to maintain the disk 4 at its operating speed.

Figure 3:
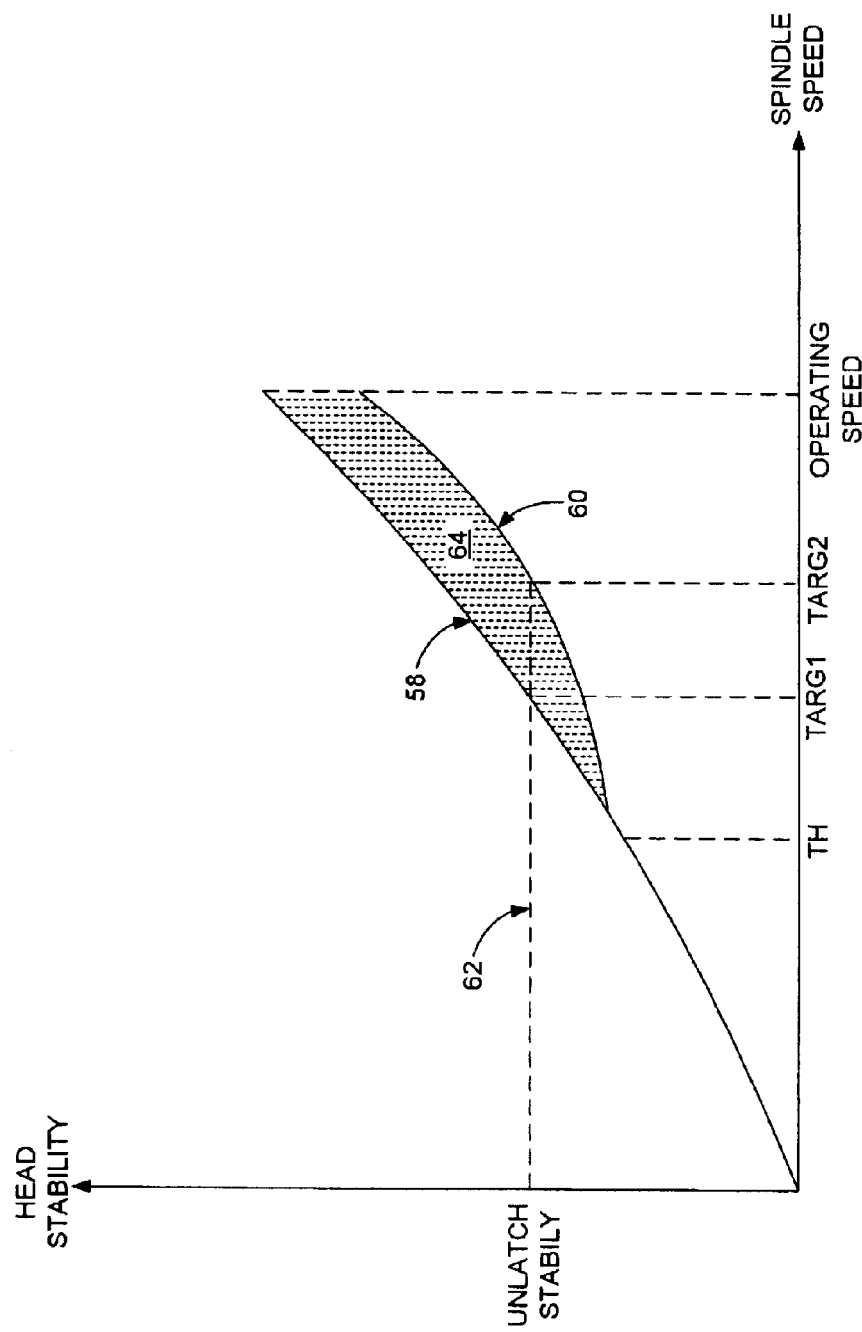
FIG. 3 illustrates head stability versus spindle speed during a normal spin-up mode and during a re-sync mode wherein the head is unlatched at a higher spindle speed to compensate for residual vibrations when the head is re-latched into the parked position during an error condition, such as a momentary power loss.

FIG. 3 is a graph showing two curves illustrating head stability versus spindle speed during a normal spin-up mode 58 and during a re-sync spin-up mode 60. During the normal spin-up mode 58, the head 10 is unlatched after reaching a target stability level 62 corresponding to a first target speed TARG1 for the spindle motor 6. During the re-sync spin-up mode 60, the head 10 may reach the target stability level 62 at a second target speed TARG2 higher than the first target speed TARG1. The deviation between the two curves 58 and 60 is due to the instability in the head 10 caused by vibrations in the actuator assembly when the actuator arm 8 is latched into the parked position during an error condition, such as a power loss. When the head 10 is vibrating, its stability relative to the spindle motor speed may fall anywhere in the shaded area 64 of the graph in FIG. 3.

The deviation between the normal spin-up mode 58 and the re-sync spin-up mode 60 in FIG. 3 is greatest immediately after the actuator arm 10 is latched into the parked position when the spindle motor 6 is rotating near its operating speed. As the speed of the spindle motor 6 decreases over time, the vibrations of the head 10 dissipate so that the two curves 58 and 60 merge. Therefore in one embodiment the disk controller 36 will enter the normal spin-up mode during the start-up process if the speed of the spindle motor 6 is less than a predetermined threshold TH. For example, if during a momentary power loss the power is off long enough for the speed of the spindle motor 6 to decrease below the predetermined threshold TH, the disk controller 36 will assume the stability of the head 10 will follow curve 58 during the spin-up process and therefore unlatch the head 10 when the spindle motor reaches the first target speed TARG1. If the speed of the spindle motor 6 is greater than the predetermined threshold TH, the disk controller 36 will assume the stability of the head 10 is somewhere in the shaded area 64 and therefore not unlatch the head 10 until the speed of the spindle motor 6 reaches the second target speed TARG2.

Figure 4:
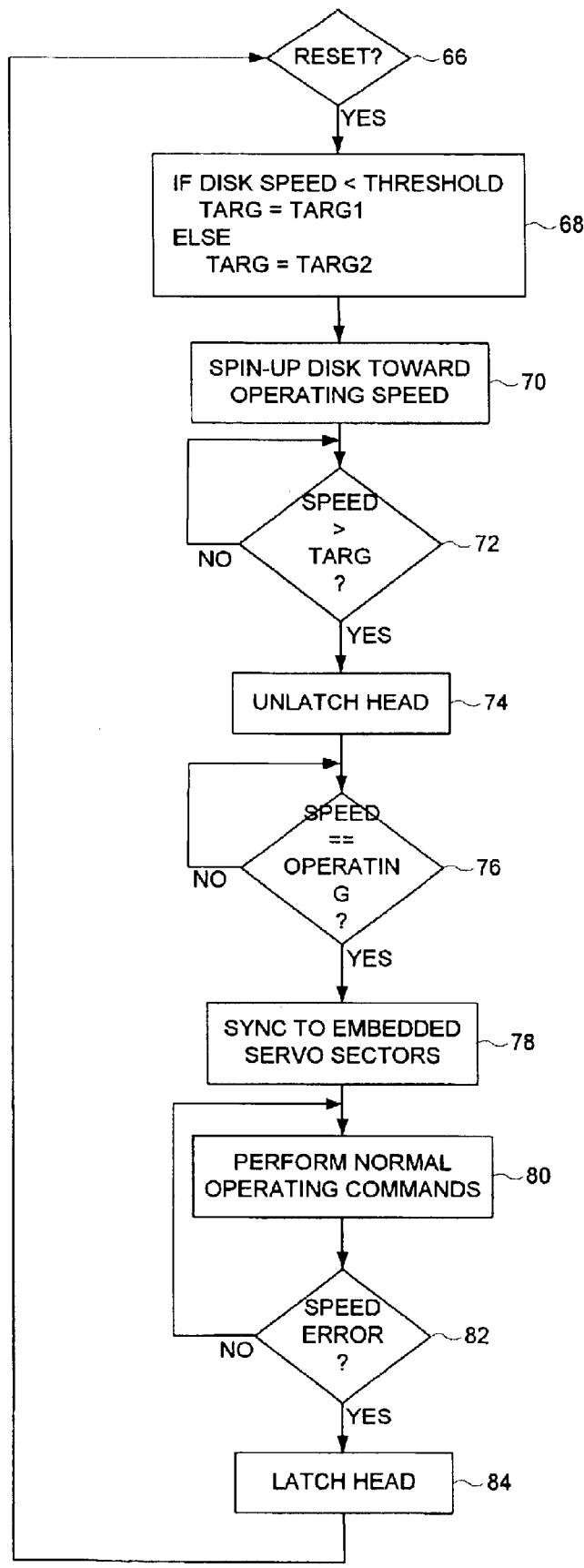
FIG. 4 shows a flow diagram executed by the control circuitry according to an embodiment of the present invention wherein the head is re-latched if a spindle speed error occurs.

FIG. 4 shows a flow diagram executed by the disk controller 36 according to an embodiment of the present invention wherein the head is re-latched if a spindle speed error occurs. If at step 66 the disk drive is reset, then at step 68 the disk controller assigns the target speed TARG to the first target speed TARG1 if the speed of the spindle motor is less than the predetermined threshold TH (FIG. 3). Otherwise the disk drive is in a re-sync spin-up mode and the disk controller assigns the target speed to the second target speed TARG2. At step 70 the disk controller controls the spindle motor to begin spinning up the disk toward its operating speed. Once the speed of the spindle motor exceeds the target speed TARG at step 72, the disk controller unlatches the head at step 74. When the speed of the spindle motor reaches its operating speed at step 76, the disk controller synchronizes to the embedded servo sectors 16 (FIG. 1A) at step 78 and begins performing normal operating commands at step 80. If at step 82 an error event (e.g., a power loss) causes the speed of the spindle motor to decrease below a predetermined threshold, then at step 84 the disk controller re-latches the head and control returns to step 66 until the disk drive is reset.

Error events other than a power loss may cause the speed of the spindle motor to decrease below the predetermined threshold such that an error event is detected. In the above referenced co-pending patent application entitled "DISK DRIVE COMPRISING AN ACTUATOR DRIVER CIRCUIT FOR RETRACTING A HEAD INDEPENDENT OF A SERVO MICROPROCESSOR WHEN A SPINDLE SPEED FAULT MODE IS DETECTED" a spindle speed error may be caused by a fault in the servo microprocessor, such as an infinite loop. An independent speed fault detector is employed which evaluates the back EMF voltages in the windings of the spindle motor to detect a spindle speed error. When a spindle speed error is detected, the head is automatically latched in to the parked position and the disk drive is reset.

We claim:

1. A disk drive comprising:
    (a) a disk;
    (b) a spindle motor for rotating the disk;
    (c) an actuator arm;
    (d) a head coupled to the actuator arm; and
    (e) disk control circuitry for:
        latching the head into a parked position when the disk drive is powered down;
        during a start-up process, controlling the spindle motor to rotate the disk toward an operating speed;
        measuring a speed of the spindle motor;
        if the disk drive is in a first spin-up mode, comparing the speed of the spindle motor to a first target speed and unlatching the head relative to the first target speed; and
        if the disk drive is in a second spin-up mode, comparing the speed of the spindle motor to a second target speed and unlatching the head relative to the second target speed, wherein:
            the first target speed and second target speed are less than the operating speed, and
            the second target speed is greater than the first target speed.

2. The disk drive as recited in claim 1, wherein the disk control circuitry comprises a microprocessor executing a control program.

3. The disk drive as recited in claim 1, wherein the first spin-up mode is a normal spin-up mode and the second spin-up mode is a re-sync spin-up mode.

4. The disk drive as recited in claim 3, wherein the disk control circuitry evaluates the speed of the spindle motor at the beginning of the start-up process to determine whether the disk drive is in the normal spin-up mode or the re-sync spin-up mode.

5. The disk drive as recited in claim 3, wherein:
    (a) the disk control circuitry re-latches the actuator arm if a predetermined error condition is detected; and
    (b) the disk drive enters the re-sync spin-up mode if the error condition causes the speed of the spindle motor to fall below the second target speed.

6. The disk drive as recited in claim 5, wherein the disk drive enters the normal spin-up mode if the error condition causes the speed of the spindle motor to fall below a threshold speed less than the first target speed.

7. The disk drive as recited in claim 1, wherein the second target speed is at least five percent greater than the first target speed.

8. A method of operating a disk drive, the disk drive comprising a disk, a spindle motor for rotating the disk, an actuator arm, and a head coupled to the actuator arm, the method comprising the steps of:
   (a) latching the head into a parked position when the disk drive is powered down;
   (b) during a start-up process, controlling the spindle motor to rotate the disk toward an operating speed;
   (c) measuring a speed of the spindle motor;
   (d) if the disk drive is in a first spin-up mode, comparing the speed of the spindle motor to a first target speed and unlatching the head relative to the first target speed; and
   (e) if the disk drive is in a second spin-up mode, comparing the speed of the spindle motor to a second target speed and unlatching the head relative to the second target speed, wherein:
      the first target speed and second target speed are less than the operating speed; and
      the second target speed is greater than the first target speed.

9. The method as recited in claim 8, wherein the first spin-up mode is a normal spin-up mode and the second spin-up mode is a re-sync spin-up mode.

10. The method as recited in claim 9, further comprising the step of evaluating the speed of the spindle motor at the beginning of the start-up process to determine whether the disk drive is in the normal spin-up mode or the re-sync spin-up mode.

11. The method as recited in claim 9, further comprising the step of re-latching the actuator arm if a predetermined error condition is detected, wherein the disk drive enters the re-sync spin-up mode if the error condition causes the speed of the spindle motor to fall below the second target speed.

12. The method as recited in claim 11, wherein the disk drive enters the normal spin-up mode if the error condition causes the speed of the spindle motor to fall below a threshold speed less than the first target speed.

13. The method as recited in claim 8, wherein the second target speed is at least five percent greater than the first target speed.

\* \* \* \* \*